United States Patent
Fujita et al.

(12)

(10) Patent No.: US 6,585,240 B1
(45) Date of Patent: Jul. 1, 2003

(54) VIBRATION RELIEF APPARATUS AND MAGNETIC DAMPER MECHANISM THEREFOR

(75) Inventors: Etsunori Fujita, Hiroshima (JP); Yasuhide Takata, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 09/642,520

(22) Filed: Aug. 18, 2000

(30) Foreign Application Priority Data

Aug. 19, 1999 (JP) ............................ 11-233308

(51) Int. Cl.[7] .............................................. B60G 11/14
(52) U.S. Cl. .................. 267/136; 267/253; 267/255
(58) Field of Search ................................ 256/136, 251, 256/253, 254, 255, 256; 188/267

(56) References Cited

U.S. PATENT DOCUMENTS

| | | | | |
|---|---|---|---|---|
| 1,344,204 A | * | 6/1920 | Hallner | 267/253 |
| 2,714,001 A | * | 7/1955 | Hersey et al. | 267/255 |
| 5,820,113 A | * | 10/1998 | Laughlin | 188/267 |
| 6,241,059 B1 | * | 6/2001 | Fujita et al. | 188/267 |

FOREIGN PATENT DOCUMENTS

FR 0 573 743 * 6/1924 ............ 267/253

* cited by examiner

Primary Examiner—Matthew C. Graham
(74) Attorney, Agent, or Firm—Steinberg & Raskin, P.C.

(57) ABSTRACT

A vibration relief apparatus capable of reducing a frequency at a resonance point, to thereby reduce vibration transmissibility, resulting in improving a feeling in riding in a vehicle during traveling thereof. A suspension unit which is a vibration relief apparatus of the present invention includes coil springs and a torsion bar substantially horizontally arranged with respect to an X-link. The coil springs constitutes a first spring mechanism having negative spring characteristics and the torsion bar constitutes a second spring mechanism having positive spring characteristics. Such configuration permits a spring system constituted by the first and second spring mechanisms to have a spring constant about an equilibrium point set to be about 0. This permits a phase delay to be produced in a low-frequency region, so that the vibration relief apparatus may exhibit enhances vibration absorbing characteristics.

8 Claims, 15 Drawing Sheets

Input of Acceleration
(Corres. to Tomei Superhighway)

Test Velocity: 100mm/min (Stroke ±17mm)

Triangular Wave (a)

(b)

Test Velocity : 100mm/min
Upper Plate Weight: 8.329kg

VIBRATION RELIEF APPARATUS AND MAGNETIC DAMPER MECHANISM THEREFOR

BACKGROUND OF THE INVENTION

This invention relates to a vibration relief apparatus and a magnetic damper mechanism therefor, and more particularly to a vibration relief apparatus suitable for use as a suspension unit for a seat for a conveyance such as an automobile, an electric railcar, a ship or the like and a magnetic damper mechanism suitable for use for such a vibration relief apparatus.

A variety of damping materials, dampers and damping techniques have been conventionally proposed as a measure to counter vibration and noise of a machine or a structure which is typically constructed of a material reduced in internal damping in order to ensure rigidity thereof.

In particular, remarkable development of a conveyance at a high velocity or speed which has been recently made causes damage to the human body and nerve due to exposure of the body to vibration of the conveyance. Such damage is generally expressed in the form of a symptom such as fatigue, headache, shoulder stiffness, lumbago, amblyopia or the like. In general, isolation of vibration is carried out by means of a suitable combination between a spring such as a metal spring, an air spring, a rubber material or the like and a damping material such as a viscoelastic material, a damper or the like. However, such a combination generally leads to such antinomic relationship as seen between, for example, a kinematic magnification and a loss factor. More specifically, a reduction in kinematic magnification for the purpose of improving low-frequency characteristics causes a spring to be decreased in loss factor, to thereby be hard, leading to a deterioration in high-frequency characteristics. Whereas, an increase in loss factor in order to improve high-frequency characteristics causes the spring to be increased in kinematic magnification, to thereby be soft, leading to a deterioration in low-frequency characteristics as in a damping material. Thus, many attempts were made to restrain vibration using a passive damping device or by quasi-active controlling or active controlling.

Under such circumstances, a suspension unit constructed as shown in FIGS. 18 and 19 was proposed as a seat for reducing vibrational energy of a conveyance. More specifically, the suspension unit generally designated at reference numeral 100 in FIGS. 18 and 19 includes a compressed coil spring 104 arranged between a lower frame 102 and an upper frame 103 coupled to each other through a linkage 101. Also, it includes a shock absorber 105 arranged therebetween so as to act as a viscous damping mechanism.

In the conventional suspension unit 100 thus constructed, the compressed coil spring 104 is configured so as to exhibit a relatively large spring constant around or about an equilibrium point in order to permit support load at a required level to be provided at a position of the equilibrium point. Also, the suspension unit 100 includes a spring 106 such as a torsion bar or the like arranged for adjusting a difference in load mass or body weight to render the position of the equilibrium point constant. Such arrangement of the spring 106 causes a spring constant of the spring 106 to be added to that of the compressed coil spring 104, resulting in a spring constant of a spring system about the equilibrium point to be increased to a level as high as, for example, k=20 N/mm. This leads to an increase in frequency band at a resonance point, to thereby cause an increase in transmissibility of vibration, resulting in load applied to the human body due to vibration during traveling of a conveyance or vehicle being enhanced, so that a symptom such as fatigue, car sickness or the like may be readily caused.

Recently, a magnetic damper has been frequently incorporated as a damping unit in a suspension unit, an engine mount or the like. The magnetic damper effectively acts as a damping force element. However, the conventional magnetic damper is highly reduced in magnetic flux density to a level substantially below 1T, resulting in being increased in velocity or speed dependency thereof, leading to a failure to produce enhanced damping force in a low velocity region.

SUMMARY OF THE INVENTION

The present invention has been made in view of the foregoing disadvantage of the prior art.

As a result of a careful study by the inventors, it was found that horizontal holding of a metal spring on a linkage for connecting one of a pair of frames or a lower frame and the other frame or an upper frame to each other permits a spring constant of a spring about an equilibrium point to be provisionally or falsely set at a value near zero (0) while employing a metal spring as the spring.

Accordingly, it is an object of the present invention to provide a vibration relief apparatus which is capable of reducing a frequency at a resonance point, to thereby decrease vibration transmissibility thereof in a high frequency region, resulting in improving a feeling in riding.

It is another object of the present invention to provide a vibration relief apparatus which is capable of being suitable for use for a suspension unit for a conveyance.

It is a further object of the present invention to provide a magnetic damper which is capable of producing damping force at an increased magnitude even at a low speed of a conveyance, to thereby be suitable for use for the above-described vibration relief apparatus.

In accordance with one aspect of the present invention, a vibration relief apparatus is provided. The vibration relief apparatus includes a linkage including a pair of frames. The other of both frames is arranged so as to be vertically movable with respect to one of the frames. The vibration relief apparatus also includes a first spring mechanism constituted of a plurality of metal springs substantially horizontally held on the linkage, holding a position of an equilibrium point and exhibiting negative spring characteristics below the equilibrium point, and a second spring mechanism for generating lifting force for adjusting a load mass difference with respect to the other frame. The first spring mechanism and second spring mechanism cooperate with each other to provide a spring system. The spring system has a superposed spring constant falsely set to be near zero about the equilibrium point.

In a preferred embodiment of the present invention, the linkage includes link members, wherein the metal springs constituting the first spring mechanism each are a tension coil spring for forcing the link members of the linkage in a direction in which the link members are closed.

In a preferred embodiment of the present invention, the metal springs each are formed by connecting a plurality of coil springs to each other in series.

In a preferred embodiment of the present invention, the second spring mechanism is constituted of a torsion bar.

In a preferred embodiment of the present invention, the vibration relief apparatus further includes a shock absorber including a piston rod and a cylinder, wherein one of the piston rod and cylinder is connected to the one frame and the other thereof is connected to the other frame.

In a preferred embodiment of the present invention, the vibration relief apparatus further includes a magnetic damper mechanism.

In a preferred embodiment of the present invention, the magnetic damper mechanism includes a pair of permanent magnets and an operation member. The permanent magnets each are constituted by a multipole magnet. The operation member is arranged so as to cross a leakage magnetic field formed at a boundary between N poles of the permanent magnets and S poles thereof when it relatively moves in a gap formed between the permanent magnets depending on vibration.

In a preferred embodiment of the present invention, the vibration relief apparatus further includes a shock absorber including a piston rod and a cylinder, wherein one of the piston rod and cylinder is connected to the one frame and the other thereof is connected to the other frame.

In accordance with another aspect of the present invention, magnetic damper mechanism which is adapted to exhibit damping performance by electromagnetic induction is provided. The magnetic damper,mechanism includes a pair of frames arranged opposite to each other, a pair of permanent magnets fixed on one of the frames and spaced from each other so as to be opposite to each other in an attracting direction, and an operation member made of a material reduced in electrical resistivity and fixedly arranged on the other of the frames so as to relatively move in a gap between the permanent magnets depending on vibration. The operation member is arranged so as to cross a leakage magnetic field formed at a boundary between N poles of the permanent magnets and S poles thereof when it relatively moves in a gap formed between the permanent magnets depending on vibration.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, the present invention will be described hereinafter with reference to FIGS. 1 to 17.

Figure 1:
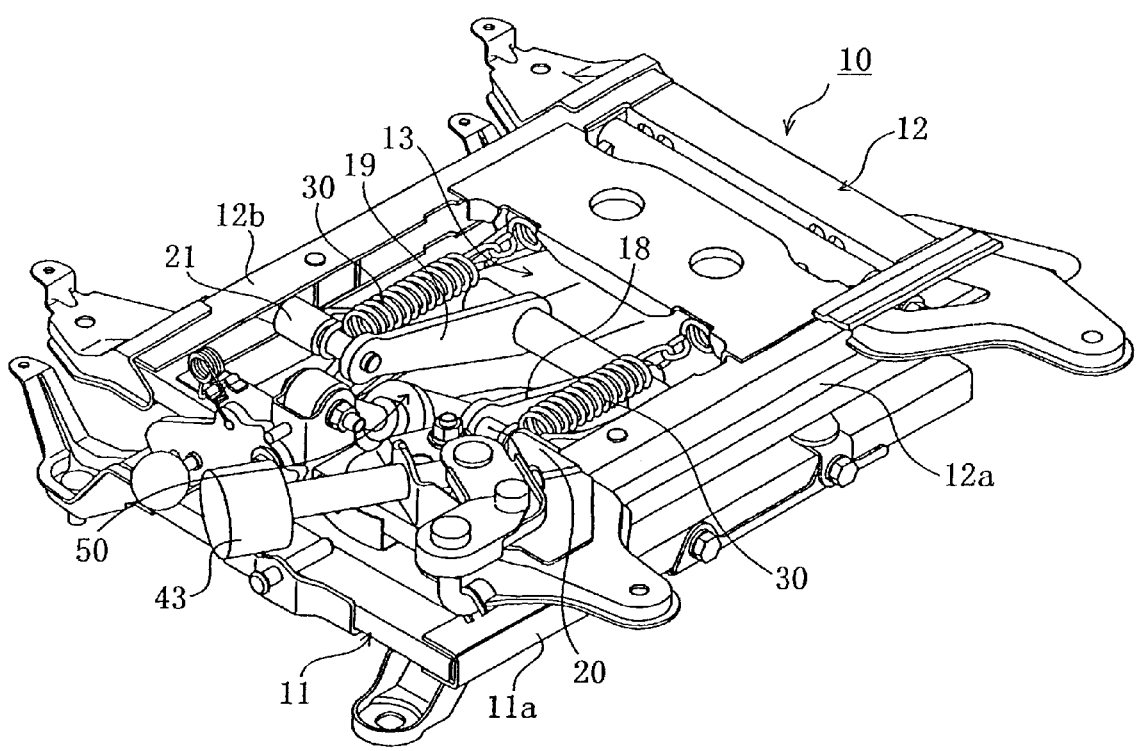
FIG. 1 is a perspective view showing a vibration relief apparatus according to a first embodiment of the present invention which is in the form of a suspension unit.
Figure 2:
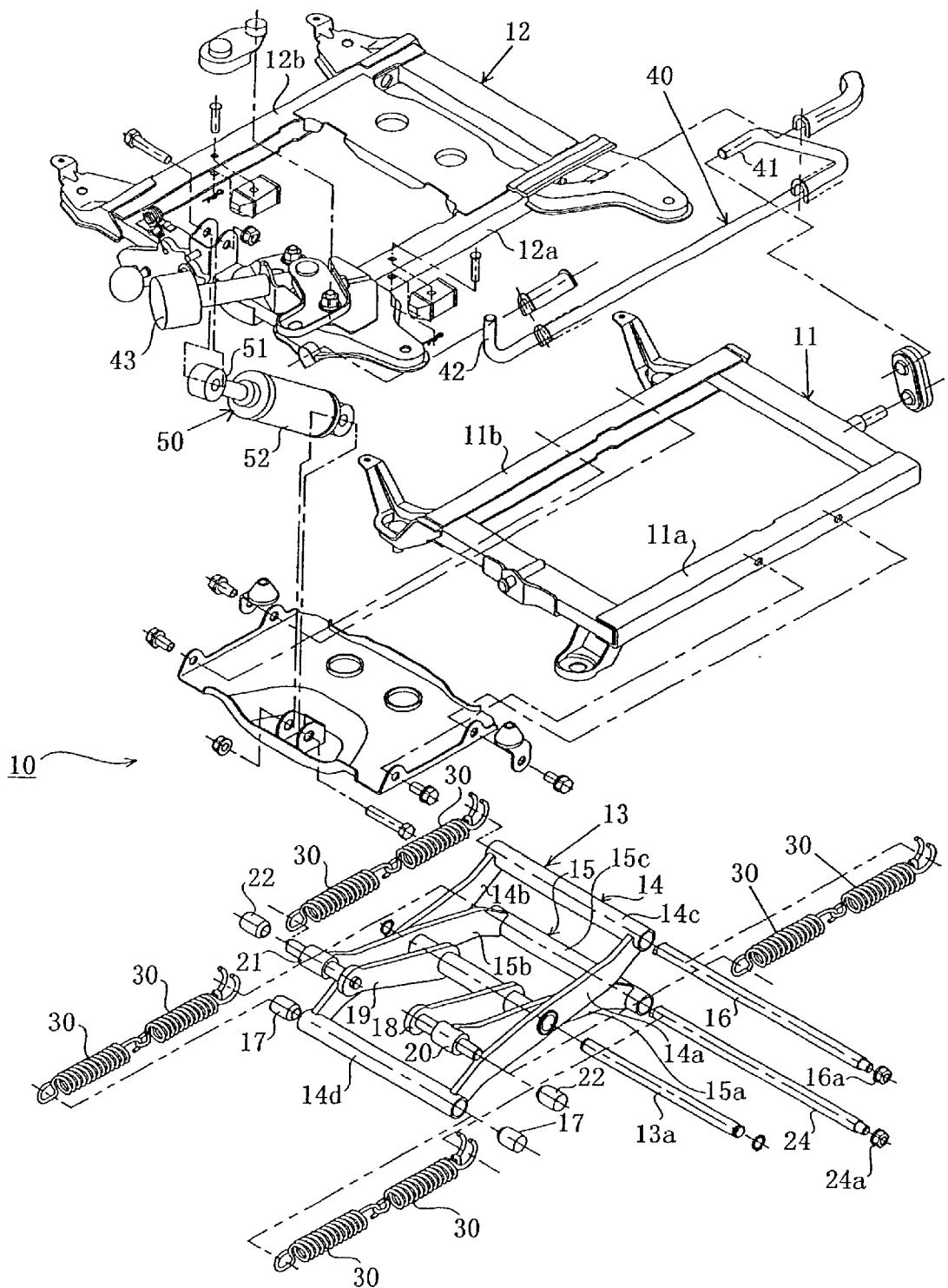
FIG. 2 is an exploded perspective view of the suspension unit shown in FIG. 1.

Referring first to FIGS. 1 and 2, a vibration relief apparatus according to a first embodiment of the present invention is illustrated, which is constructed in the form of a suspension unit. The suspension unit of the illustrated embodiment generally designated at reference numeral 10 includes a lower frame 11 adapted to be fixed on a side of a vibration source such as a floor of a vehicle or the like by means of bolts or the like and an upper frame 12 vertically movably mounted on the lower frame 11 through a linkage constituted of an X-link 13.

The X-link 13 includes a first link member 14 formed into a substantially rectangular shape and a second link member 15 formed into a substantially U-shape, which are connected at a substantially central portion thereof to each other through a pivot shaft 13a in a manner to cross each other in an X-like manner while keeping first and second side plates 14a and 14b of the first link member 14 and first and second side plates 15a and 15b of the second link member 15 crossing each other, respectively. The first link member 14 includes a first connection 14c arranged between the respective upper portions of the side plates 14a and 14b of the first link member 14 to connect the upper portions to each other therethrough and a second connection 14d arranged between the respective lower portions of the side plates 14a and 14b to connect the lower portions to each other therethrough. The first connection 14c is formed into a hollow cylindrical shape and has a connection shaft 16 inserted thereinto. The connection shaft 16 is secured at both ends thereof to first and second side frames 12a and 12b of a substantially U-shape in section constituting the upper frame 12 by means of nuts 16a. The second connection 14d is rotatably mounted on each of both ends thereof with a roller 17. The roller 17 on each of both ends of the second connection 14d is positioned in a recess of each of first and second side frames 11a and 11b of a substantially U-shape constituting the lower frame 11 in a manner to be slidable therein.

The X-link 13 also includes two or first and second auxiliary arms 18 and 19, each of which is connected at one end thereof between the respective upper portions of the side plates 15a and 15b of the second link member 15 through the pivot shaft 13a. Also, the X-link 13 includes a first connection shaft 20 arranged between the first side plate 15a of the second link member 15 and the first auxiliary arm 18 and a second connection shaft 21 arranged between the second side plate 15b of the second link member 15 and the second auxiliary arm 19. The first and second connection shafts 20 and 21 each are mounted on an outer end thereof with a roller 22. The rollers 22 are arranged so as to be positioned in recesses of the side frames 12a and 12b constituting the upper frame 12 in a manner to be slidable therein. The second link member 15 has a connection 15c arranged between the respective lower portions of the first and second side plates 15a and 15b and formed into a hollow cylindrical shape. The connection 15c has a connection shaft 24 inserted thereinto. The connection shaft 24 is secured at both ends thereof to the first and second side frames 11a and 11b of the lower frame 11 by means of nuts 24a.

The above-described configuration of the X-link 13 permits the lower frame 11 and upper frame 12 to be approached each other while being kept parallel to each other when the rollers 17 and 22 are slid so that the respective upper portions of the link members 14 and 15 are approached to each other and the respective lower portions of the link members 14 and 15 are approached to each other. Also, it permits the frames 11 and 12 to be separated from each other while being kept parallel to each other when they are moved away from each other. In the illustrated embodiment, the linkage is constituted of the X-link 13. However, it is not limited to such construction. It may be constructed of, for example, a pantograph-like link.

The X-link 13 also includes coil springs 30 horizontally arranged between the respective upper portions of the first link member 14 and second link member 15 and between the respective lower portions thereof so as to constitute a first spring mechanism. More specifically, coil springs 30 are arranged between the first or upper connection 14c of the first link member 14 and the first or upper connection shaft 20 of the second link member 15 and between the first connection 14c of the first link member 14 and the second connection shaft 21 of the second link member 15. The coil springs 30 each are constituted of two tension coil spring members connected in series to each other.

Further, other coil springs 30 are arranged between the second or lower connection 14d of the first link member 14 and the connection 15c of the second link member 15 in a manner to be laterally spaced from each other. The coil springs 30 each are likewise constituted of two tension coil spring members connected in series to each other.

The coil springs 30 held on the X-link 13 so as to constitute the first spring mechanism, as described above, each are constructed of the tension coil spring members, resulting in normally forcing the respective upper portions of the first and second link members 14 and 15 and the respective lower portions thereof in a direction of approaching them to each other. Also, the coil springs 30 each are arranged so as to hold its natural length during non-load.

The suspension unit 10 of the illustrated embodiment also includes a second spring mechanism, which is constituted by a torsion bar 40. The torsion bar 40 has one end 41 fixed on the lower frame 11 and the other end fixed on the upper frame 12, to thereby impart lifting force to the upper frame 12. The torsion bar 40 acts as a spring for adjusting a difference in load mass or body weight. This permits an equilibrium point to be kept constant, to thereby stabilize vibrational characteristics of the first spring mechanism, even when there is a difference in body weight between drivers or crews. The torsion bar 40 exhibits urging force, which is adjusted depending on a body weight of a driver by operating a lever 43. The second spring mechanism may be also constructed of a coil spring, a spiral spring or the like other than the torsion bar 40 so long as it exhibits the above-described function. Nevertheless, the second spring mechanism is preferably constituted of a torsion bar because it permits adjustment of a spring constant thereof to be facilitated.

Metal springs or, in the illustrated embodiment, the coil springs 30 constituting the first spring mechanism, as described above, are arranged so as to be horizontal with respect to the X-link 13, resulting in exhibiting negative spring characteristics, whereas the torsion bar 40 constituting the second spring mechanism imparts lifting force to the upper frame 12, to thereby exhibit positive spring characteristics. This permits an added or superposed spring constant of a spring system constituted by the first spring mechanism and second spring mechanism to be falsely near zero (0) around or about the equilibrium point which is in a usual working area.

Figure 3:
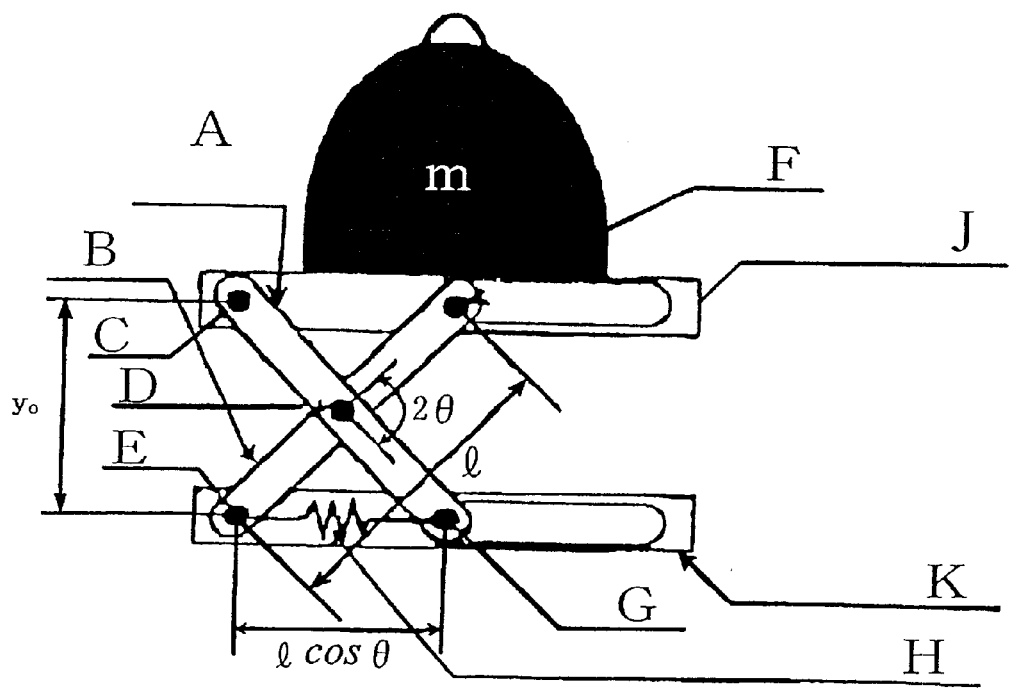
FIG. 3 is a schematic view showing an experimental unit for a damping system used for studying negative spring characteristics exhibited by a first spring mechanism.

Now, the negative spring characteristics of the first spring mechanism will be described. FIG. 3 schematically shows an experimental unit for a damping system used for studying the negative spring characteristics, which is constructed in substantially the same manner as in FIGS. 1 and 2, wherein an X-link is constituted by link members A and B arranged so as to define a fulcrum-fulcrum distance l therebetween and coupled to an upper frame J and a lower frame K by means of pins C, D and E and rollers F and G. Also, a mass m is upwardly moved through the upper frame J by means of a metal spring H and kept equilibrated or balanced at a height $y_o$ and a link cross angle $2\theta$. The metal spring H has a spring constant k and a distance between the pin E and the roller G during non-load is set to be equal to a natural length $l_o$ of the metal spring H.

Figure 4:
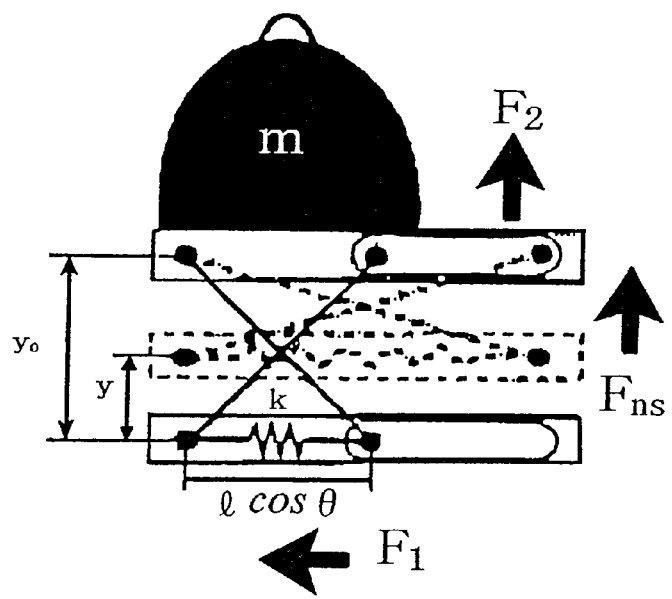
FIG. 4 is a schematic view showing an experimental unit for a damping system used for studying negative spring characteristics exhibited by a first spring mechanism.

In order to seek relationship of the balanced state shown in FIG. 3, a principle of virtual work is applied supposing that displacement is carried out by means of external force $F_{ns}$ as shown in FIG. 4. Total potential energy V of a system to which potential energy by the load mass m and potential energy by restoring force $F_1$ of the metal spring H are added is given by the following expression (1):

$$V = \tfrac{1}{2}k(l\cos\theta - l_o)^2 + mg\,l\sin\theta \qquad (1)$$

The system is balanced, so that a derivative of the total potential energy may be rendered zero as indicated by the following expression (2):

$$\frac{dV}{d\theta} = -k(l\cos\theta - l_0)l\sin\theta + mgl\cos\theta = 0 \quad (2)$$

Restoring force of the metal spring H is $F_1=k (l \cos \theta - l_0)$ Supposing that force generated on the upper frame J by $F_1$ is $F_2$, $F_2$ is kept balanced with the load weight mg, so that the expression (2) may be expressed by the following expression (3)

$$F_2 = \frac{y_0}{\sqrt{l^2 - y_0^2}} F_1 \quad (3)$$

Then, force is applied to the lower frame K, thus, relationship between the external force $F_{ns}$ and the displacement y obtained when the system is out of the equilibrated or balanced position as indicated at broken lines is expressed by the following expression (4):

$$F_{ns} = mg + \frac{ky_0 l_0}{\sqrt{l^2 - y_0^2}} - y_0 k \sqrt{1 + \frac{2yy_0 - y^2}{l^2 - y_0^2}} \quad (4)$$

wherein a third term on a right side of the expression indicates negative spring characteristics.

When the spring constant is to be rendered variable to permit such characteristics to be produced by only the metal spring, it is required that the metal spring is formed into a thick and large configuration in order to restrict the spring constant to a low level. However, the construction of the illustrated embodiment that the coil springs 30 each are formed by connecting two coil spring members to each other in series permits the coil spring to effectively exhibit the same characteristics while preventing a size of the coil spring from being increased.

In FIGS. 1 and 2, reference numeral 50 designates a shock absorber, wherein a piston rod 51 is connected to the upper frame 12 and a cylinder 52 is connected to the lower frame 11. In the illustrated embodiment, the shock absorber 50 exhibits damping force sufficient to permit the shock absorber to effectively absorb shock increased in amplitude at a large magnitude applied thereto, resulting in preventing the suspension unit from being contacted with a bottom or floor of a vehicle.

Figure 5:
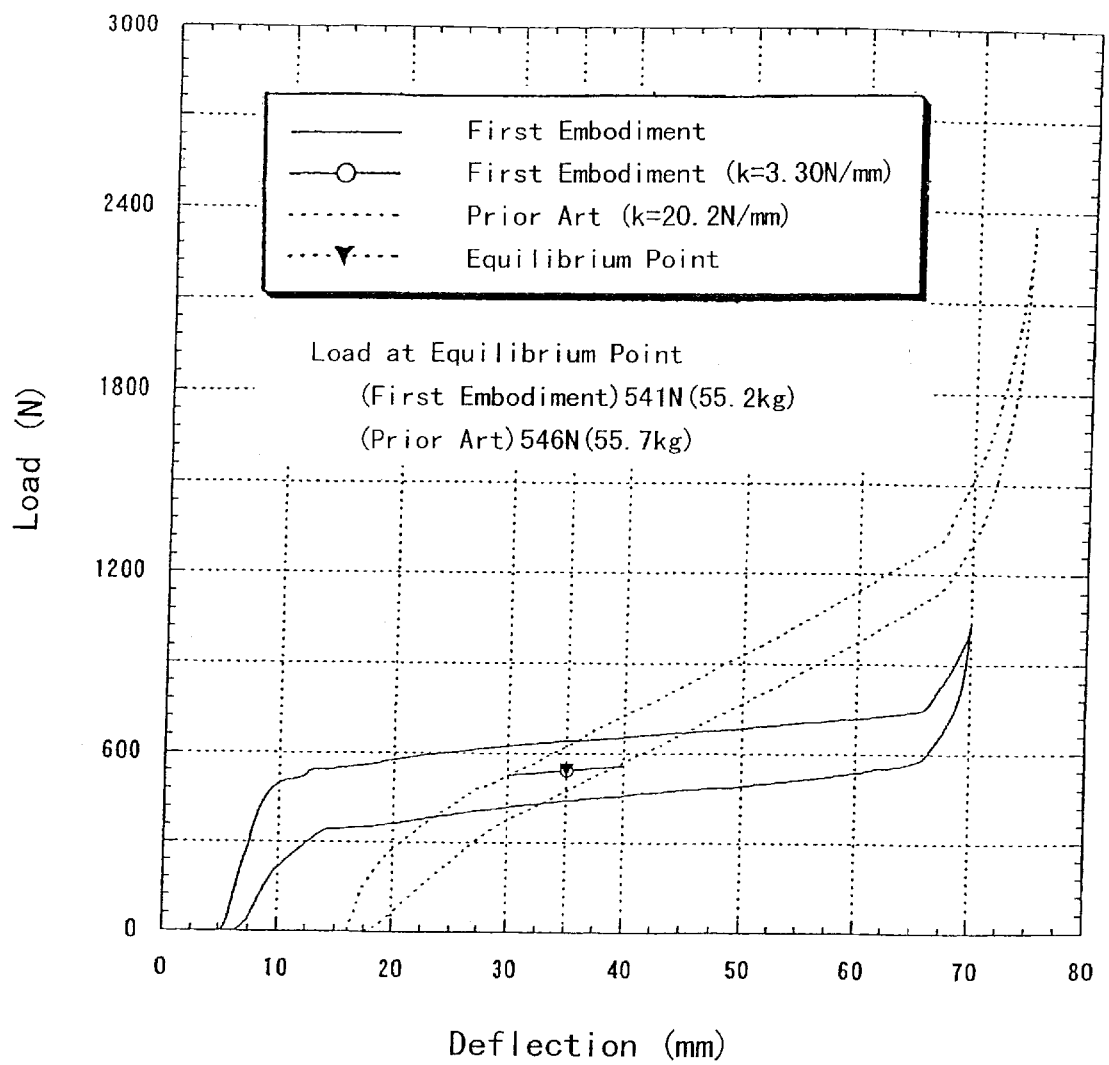
FIG. 5 is a graphical representation showing load-deflection characteristics of the suspension unit of FIG. 1.

The suspension unit 10 including the coil springs 30 substantially horizontally arranged so as to constitute the first spring mechanism and the torsion bar 40 constituting the second spring mechanism was subject to measurement of restoring force and displacement characteristics about the equilibrium point. The results were as indicated in FIG. 5, which is a graphical representation showing load-deflection characteristics of the suspension unit. As noted from FIG. 5, the superposed spring constant of the spring system around the equilibrium point is near zero and lifting force is kept substantially constant within a predetermined range (or near the equilibrium point) irrespective of a variation in deflection. Thus, the suspension unit 10 of the illustrated embodiment causes only the lower frame 11 to be vertically displaced in response to load (vibration) applied thereto from a vehicle body without substantially displacing the upper frame 12 and a seat carried thereon. This permits a phase delay in a low frequency range to occur in a resonance region at a low frequency, to thereby lead to occurrence of a reverse phase, resulting in absorbing vibrational energy. The illustrated embodiment is not so constructed that vibrational energy is absorbed by damping force of the shock absorber even in a damping region at a high frequency. Thus, the illustrated embodiment limits transmission of acceleration to a low level in a high frequency region as well as a low frequency region.

An equation of motion of free vibration of a system having such restoring force and history characteristics as shown in FIG. 5 is expressed by the following expression (5):

$$m\ddot{x} + c\dot{x} + g(x) + \frac{\dot{x}}{|\dot{x}|}h(x) = 0 \quad (5)$$

wherein $$g(x) = px + qx^3 \quad (6)$$

wherein g (x) indicates restoring force when friction of the link is not present.

An equation of motion when the apparatus is subject to displacement excitation is indicated in the following expression (7) by rewriting the expression (6) described above:

$$m\ddot{x} + c(\dot{x} - \dot{y}) + k_1(x-y) + k_3(x-y)^3 + \quad (7)$$
$$\frac{4}{\pi} F_{fr}\alpha\left(\cos\omega t - \frac{1}{3}\cos3\omega t + \frac{1}{5}\cos5\omega t \cdots \right) +$$
$$h_1(x-y) + h_3(x-y)^3 = 0$$

wherein $\alpha$ indicates a friction coefficient, $F_{fr\alpha}$ is h(x) which is the amount of hysteresis loss in a static load-displacement curve, and displacement excitation is y=Y cos $\omega$t. The term $$h_1(x-y) + h_3(x-y)^3$$

is a correction term by dynamic characteristics.

A state of disturbance offset is represented by the following expression (8) using relative displacement z:

$$m\ddot{z} + c\dot{z} + k(z + \beta z^3) + \quad (8)$$
$$\frac{4}{\pi} F_{fr}\alpha\left(\cos\omega t - \frac{1}{3}\cos3\omega t + \frac{1}{5}\cos5\omega t \cdots \right) = -m\ddot{y}$$

wherein $$Z=x-y,\ k=k_1+h_1,\ \beta=(k_3+h_3)/(k_1+h_1) \quad (9)$$

Supposing that the lower frame is subject to any displacement excitation, the vibration is indicated by a sum of a basic component of the displacement excitation and a high-frequency component thereof. Now, supposing that only the basic component is considered, a solution of forced vibration is generally represented by the following expression (10):

$$Z = a\cos(\omega t - \phi) \quad (10)$$

wherein a indicates amplitude and $\phi$ is a phase delay. When the expression (10) is substituted for the expression (8) and a vibration component at a high order is omitted, the following expression (11) is obtained:

$$\left(-ma\omega^2 + ka + \frac{3}{4}k\beta a^3\right)\cos(\omega t - \phi) - ca\omega\sin(\omega t - \phi) = \quad (11)$$

$$\left(mY\omega^2 - \frac{4}{\pi}F_{fr}\alpha\right)\cos\phi \cdot \cos(\omega t - \phi) -$$

$$\left(mY\omega^2 - \frac{4}{\pi}F_{fr}\alpha\right)\sin\phi\sin(\omega t - \phi)$$

Now, when comparing a coefficient of $\cos(\omega t-\phi)$ and that of $\sin(\omega t-\phi)$ with each other, the following expression (12) is obtained:

$$-ma\omega^2 + ka + \frac{3}{4}k\beta a^3 = \left(mY\omega^2 - \frac{4F_{fr}\alpha}{\pi}\right)\cos\phi, \quad (12)$$

$$ca\omega = \left(mY\omega^2 - \frac{4F_{fr}\alpha}{\pi}\right)\sin\phi$$

When the above expressions are squared and then added together, the following expression (13) is obtained:

$$(a^2 - Y^2)\left(\frac{\omega}{\omega_0}\right)^4 + 2\left[\frac{4}{\pi}F_{fr}\alpha\frac{Y}{k} - a^2\left(1 + \frac{3}{4}\beta a^2\right) + 2\zeta^2 a^2\right]\left(\frac{\omega}{\omega_0}\right)^2 + \quad (13)$$

$$a^2\left(1 + \frac{3}{4}\beta a^2\right)^2 - \frac{1}{k^2}\left(\frac{4}{\pi}F_{fr}\alpha\right)^2 = 0$$

wherein $$\omega_0 = (k/m)^{1/2},\ \zeta = c/2(mk)^{-1/2} \quad (14)$$

Thus, the following expressions (15) and (16) are obtained:

$$\left(\frac{\omega}{\omega_0}\right)^2 = \frac{1}{a^2 - Y^2}\left[\frac{3}{4}\beta a^4 + (1 - 2\zeta^2)a^2 - \frac{4F_{fr}\alpha Y}{\pi k}\right]^2 \pm \quad (15)$$

$$\frac{a}{a^2 - Y^2}\sqrt{\left(\frac{3}{16}\beta Y^2 - \zeta^2\right)3\beta a^4 + \left[4\zeta^2(\zeta^2 - 1) - \frac{3}{2}\beta Y\left(\frac{4F_{fr}\alpha}{\pi k} - Y\right)\right]a^2 + \left(\frac{4F_{fr}\alpha}{\pi k} - Y\right)^2 + \frac{16F_{fr}\alpha Y}{\pi k}\zeta^2}$$

$$\phi = \tan^{-1}c\frac{\omega}{k\left(1 + \frac{3}{4}\beta a^2\right) - m\omega^2} \quad (16)$$

Figure 8:
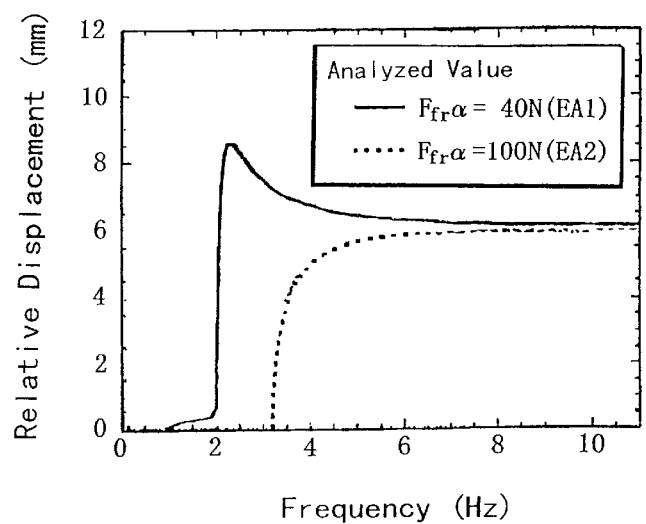
FIG. 8 is a graphical representation showing a relative displacement curve obtained on the basis of an analyzed value calculated according to an expression (15) described hereinafter.
Figure 9:
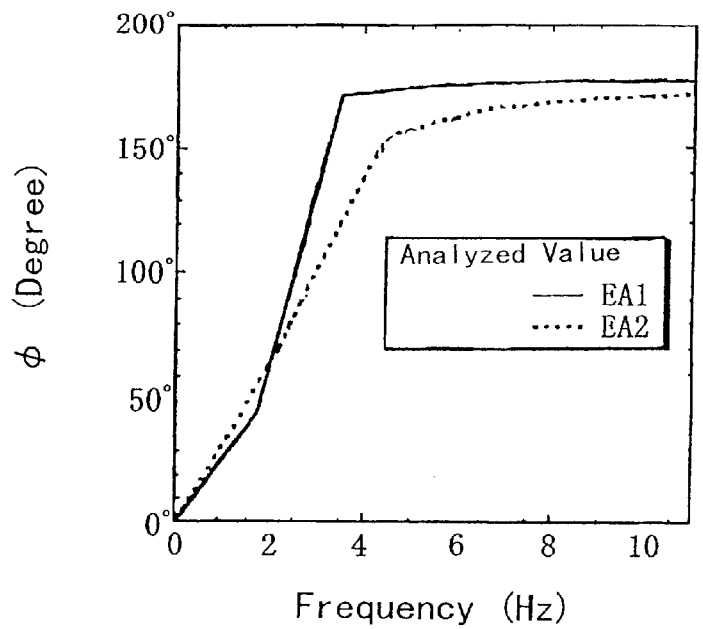
FIG. 9 is a graphical representation showing a relative displacement curve obtained on the basis of an analyzed value calculated according to an expression (16) described hereinafter.

Analyzed values shown in FIGS. 8 and 9 are sought from the expressions (15) and (16). Lines EA1 and EA2 are derived from a magnitude of the hysteresis loss. FIG. 5 indicates the fact that the hysteresis loss in the illustrated embodiment corresponds to EA2. Thus, seeking of a resonance frequency from the fact permits a transfer function which has a resonace crest near 2 Hz to be provided. Thus, it enters a damping region at a frequency of 3 Hz or more. This can be also discriminated from FIGS. 8 and 9 which show a graph of the EA2 corresponding to the illustrated embodiment.

Figure 18:
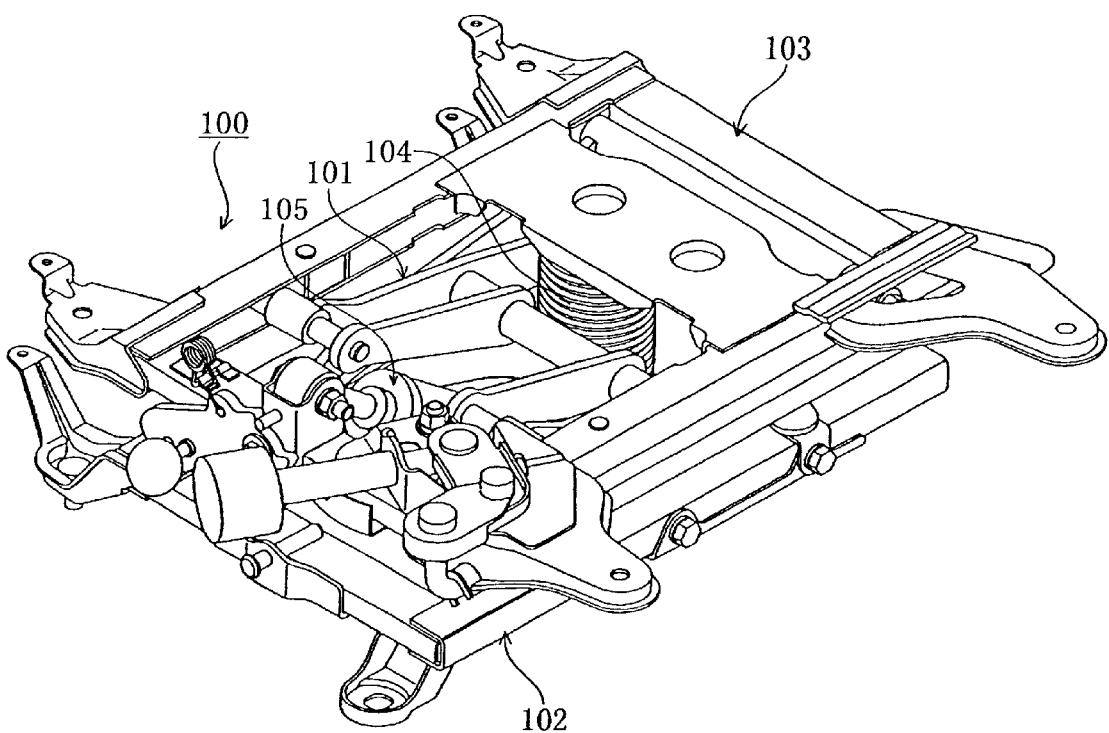
FIG. 18 is a perspective view showing a conventional vibration relief apparatus in the form of a suspension unit.
Figure 19:
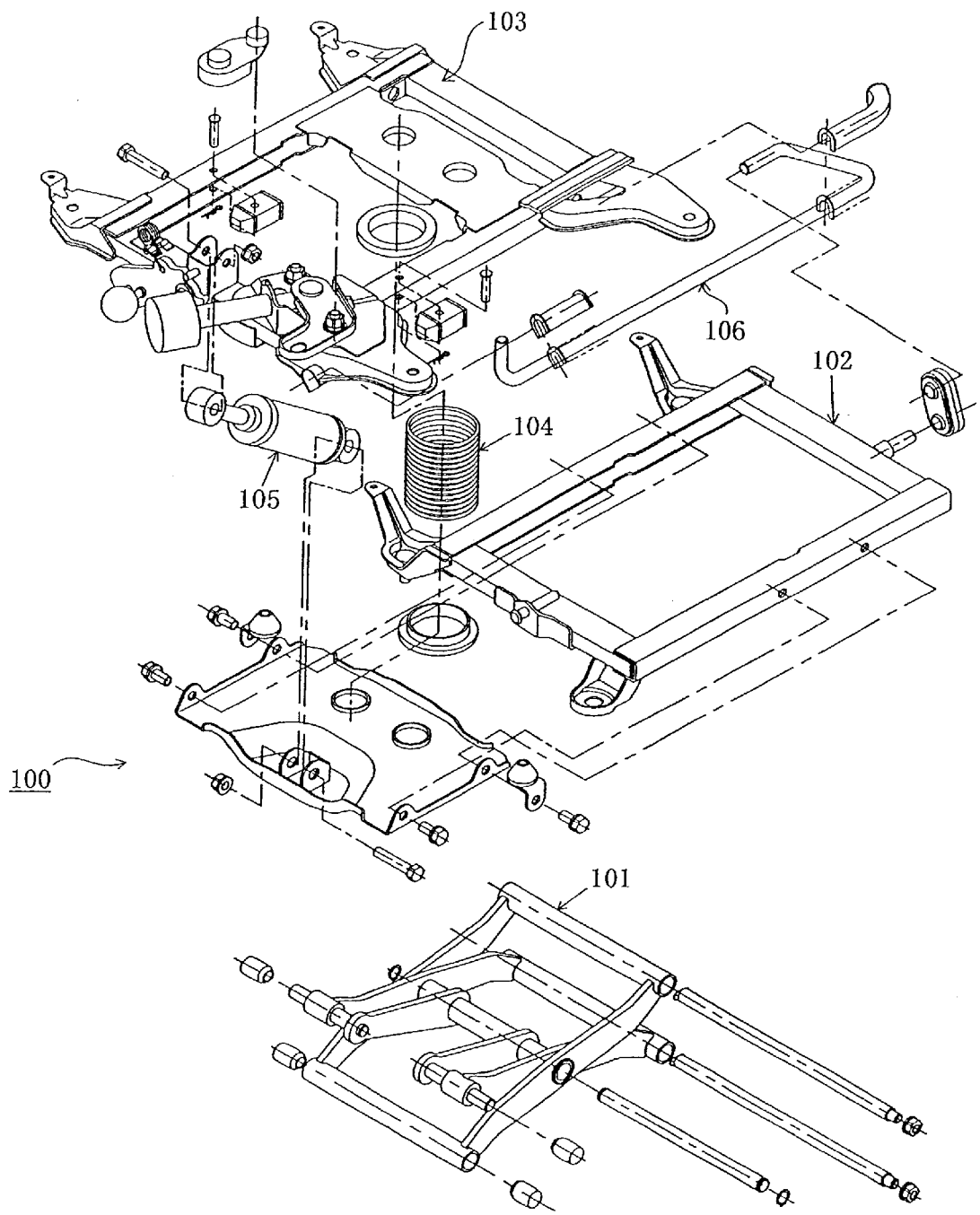
FIG. 19 is a exploded perspective view of the conventional suspension unit shown in FIG. 18.

Also, an experiment was carried out on vibrational characteristics of each of the suspension unit 10 of the illustrated embodiment shown in FIGS. 1 and 2 and the conventional suspension unit 100 described above with reference to FIGS. 18 and 19, wherein a load mass was set to be 60 kg and each of the suspension units 10 and 100 was subject to excitation using a random wave gathered on the Tokyo-Nagoya (Tomei) superhighway. The results were as shown in FIG. 6.

Figure 6:
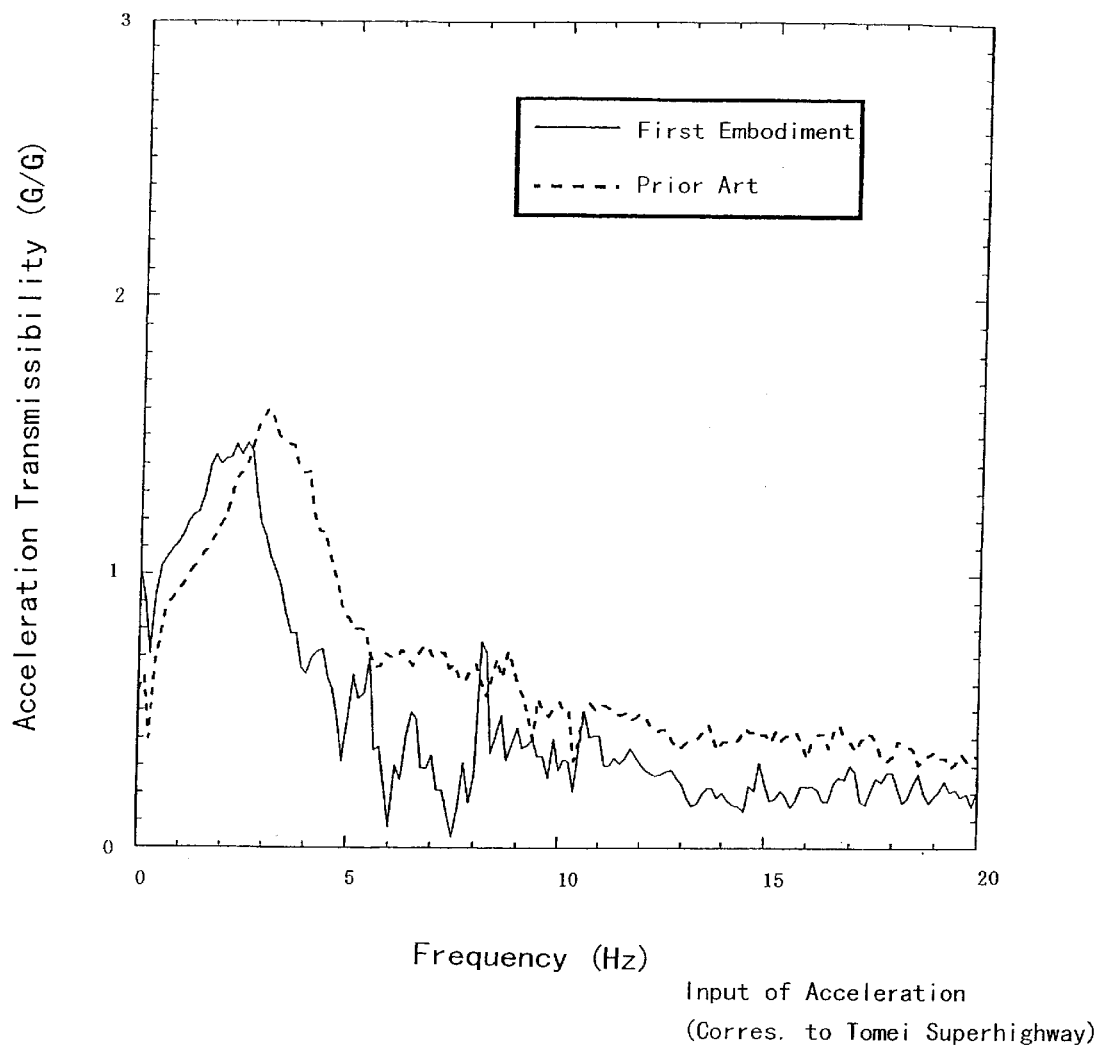
FIG. 6 is a graphical representation showing frequency characteristics of each of the suspension unit of FIG. 1 and the conventional suspension unit obtained by exposing the suspension units to excitation by a random wave gathered on a superhighway.

As will be noted from FIG. 6, the resonance crest is transferred to a low-frequency region. This indicates that the suspension unit of the illustrated embodiment effectively reduces vibration generated over a wide range extending from 3 Hz or more which the human body sensitively senses to a high-frequency region.

Figure 7:
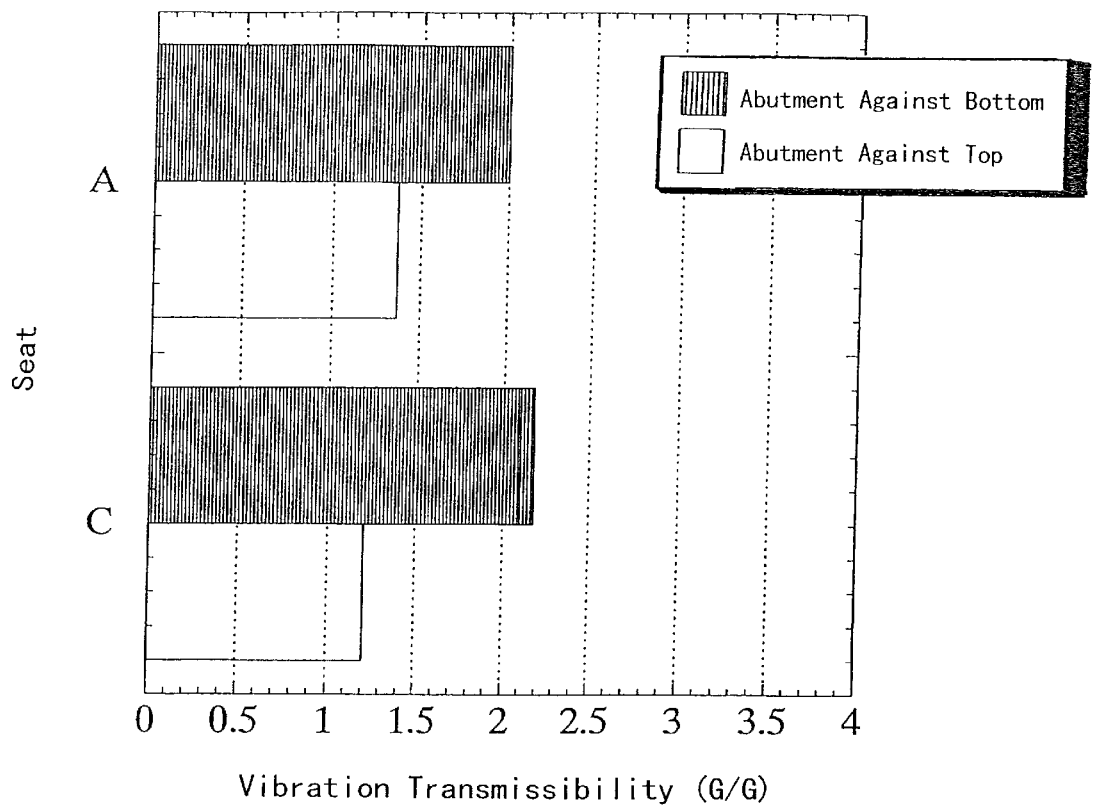
FIG. 7 is a graphical representation showing evaluation of a transient feeling in riding in a vehicle with respect to input of impact to the vehicle during passage of the vehicle on projections.

FIG. 7 shows evaluation on a transient feeling in riding in a vehicle with respect to inputting of shock to the vehicle during passage of the vehicle on projections such as roughness of a road. The evaluation was made under the conditions that variation at 2.0 Hz is inputted to the vehicle at a rate of 15 m/s$^2$. In FIG. 7, A designates a seat in which the suspension unit 10 of the illustrated embodiment shown in FIGS. 1 and 2 is incorporated and C is a seat having the conventional suspension seat 100 shown in FIGS. 18 and 19 incorporated therein.

As will be noted from the results shown in FIG. 7, the seat A exhibits shock absorbing characteristics at substantially the same level as that of the seat C while being significantly improved in vibrational characteristics. The suspension unit 10 of the illustrated embodiment applied to the evaluation included the same shock absorber as in the conventional suspension unit 100 shown in FIGS. 18 and 19.

Figure 10:
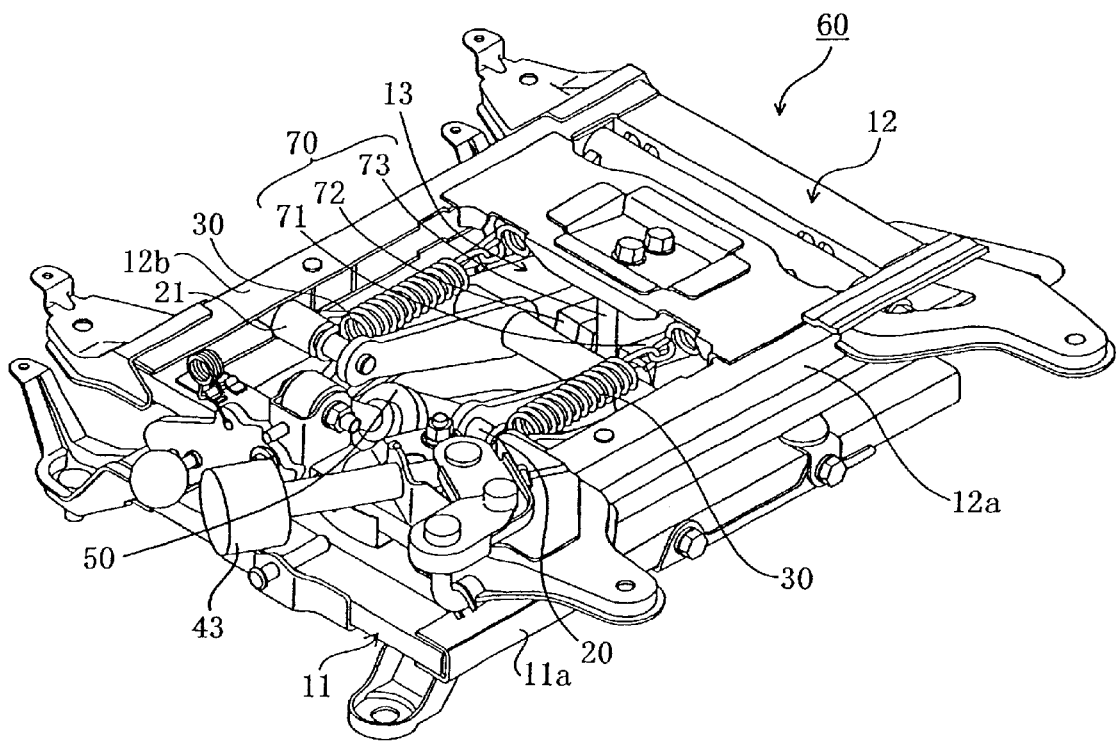
FIG. 10 is a perspective view showing a vibration relief apparatus according to a second embodiment of the present invention which is in the form of a suspension unit.
Figure 11:
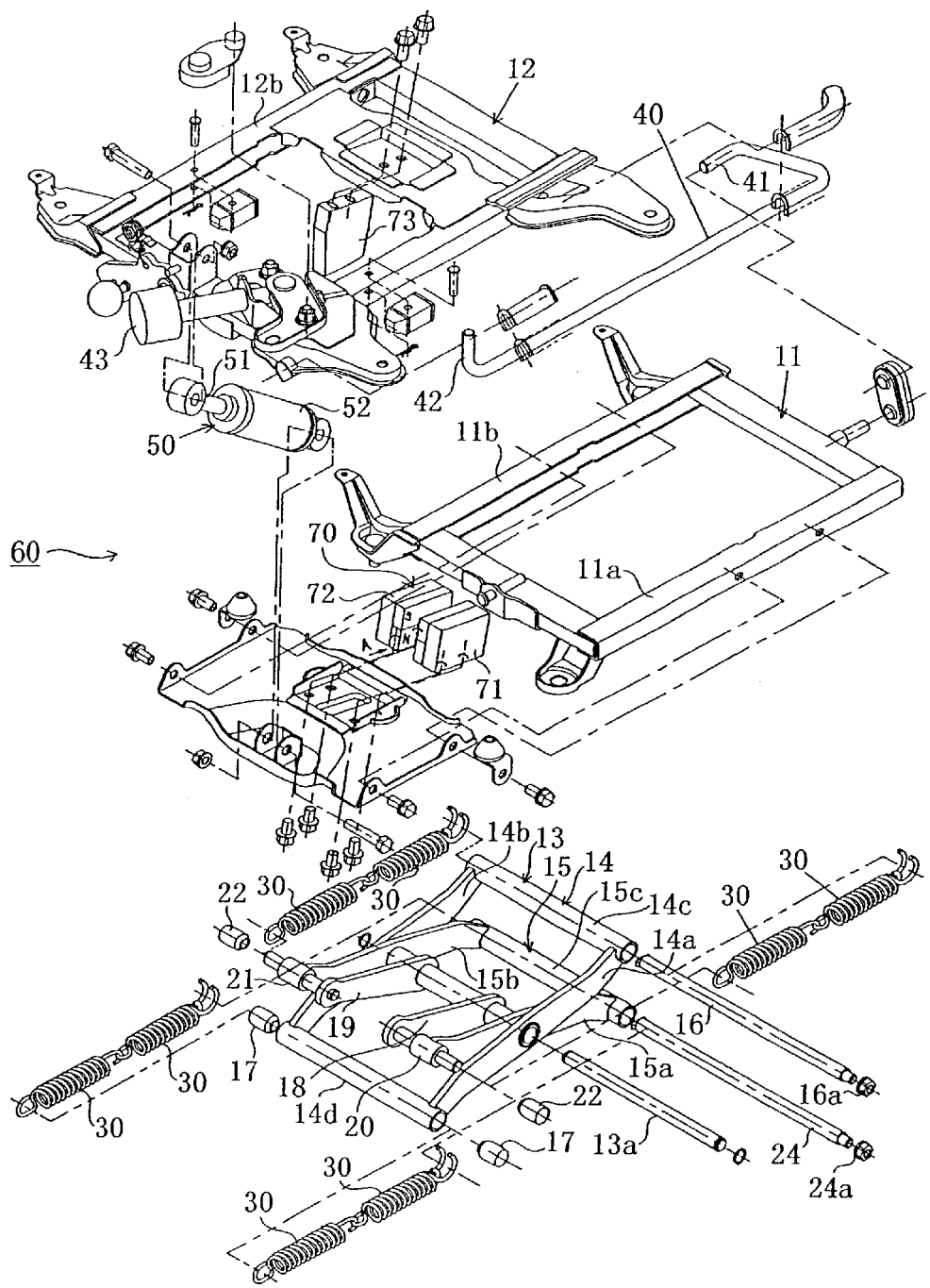
FIG. 11 is an exploded perspective view of the suspension unit shown in FIG. 10.
Figure 12:
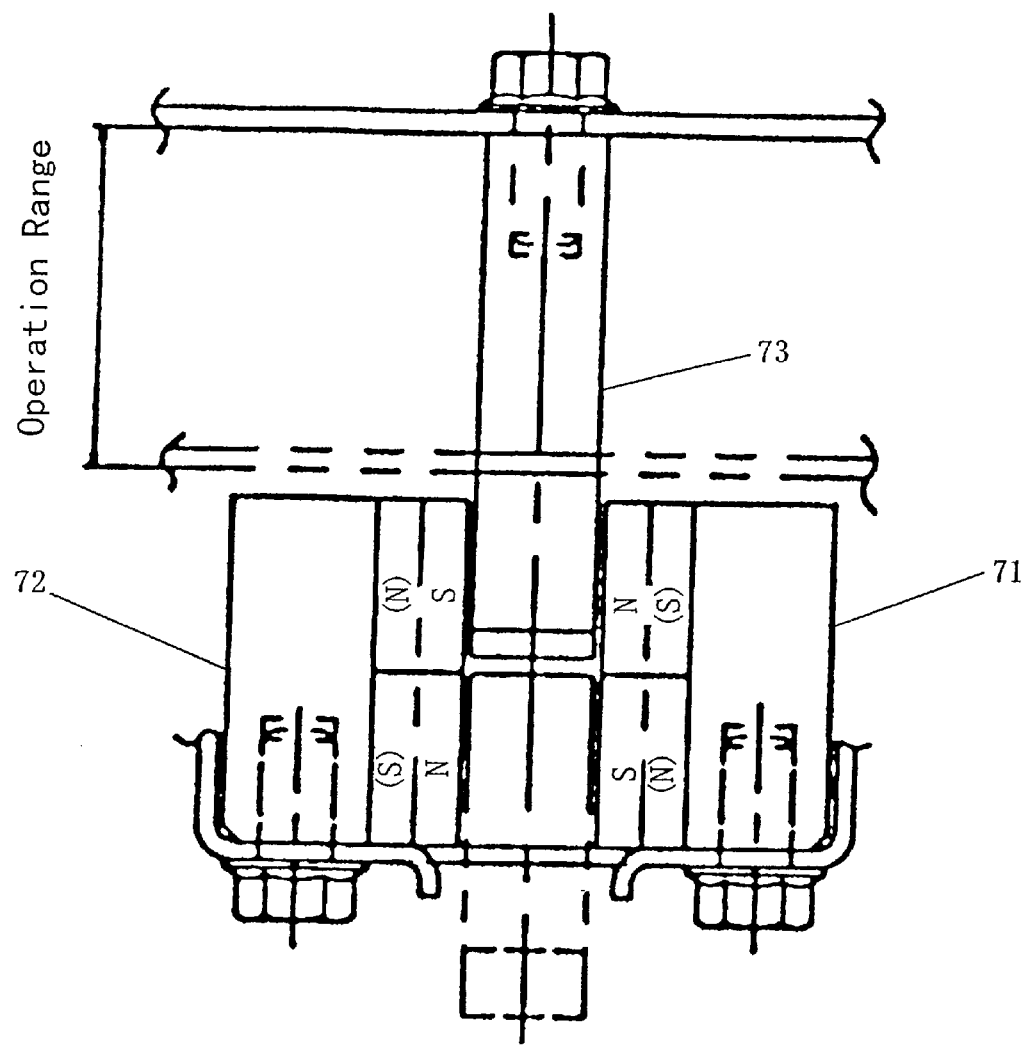
FIG. 12 is a view taken along an arrow A in FIG. 11.

Referring now to FIGS. 10 to 12, a vibration relief apparatus according to a second embodiment of the present invention is illustrated, which is likewise constructed in the form of a suspension unit. In FIGS. 10 and 12, reference numerals like those in FIGS. 1 and 2 designate corresponding parts.

Thus, in a suspension unit of the illustrated embodiment generally designated at reference numeral 60, a lower frame 11, an upper frame 12, an X-link 13, coil springs 30 constituting a first spring mechanism, a torsion bar 40 constituting a second spring mechanism and the like are constructed in the same manner as those in the first embodiment described above.

The suspension unit 60 of the illustrated embodiment is featured in that it includes a magnetic damper mechanism 70 in addition to the above-described elements. The magnetic damper mechanism 70 includes a pair of permanent magnets 71 and 72 fixed on the lower frame 11 and arranged so as to keep different poles thereof facing each other or so as to be opposite to each other in an attracting direction or a direction in which the magnets attract each other while being spaced from each other. Also, it includes an operation member 73 made of a material reduced in electrical resistivity such as, for example, copper and mounted on the upper frame 12 so as to be movable relatively to the permanent magnets 71 and 72 in a gap therebetween. Such configuration of the suspension unit 60, when load (vibration) is applied to the lower frame 11, permits the suspension unit 60 to exhibit damping performance due to electromagnetic induction, because the operation member 73 carries out relative movement in the gap between the permanent magnets 71 and 72. The permanent magnets 71 and 72 and operation member 73 may be arranged in a manner contrary to the above. Thus, the permanent magnets 71 and 72 may be arranged on the upper frame 12 and the operation member 73 may be arranged on the lower frame 11.

Figure 13:
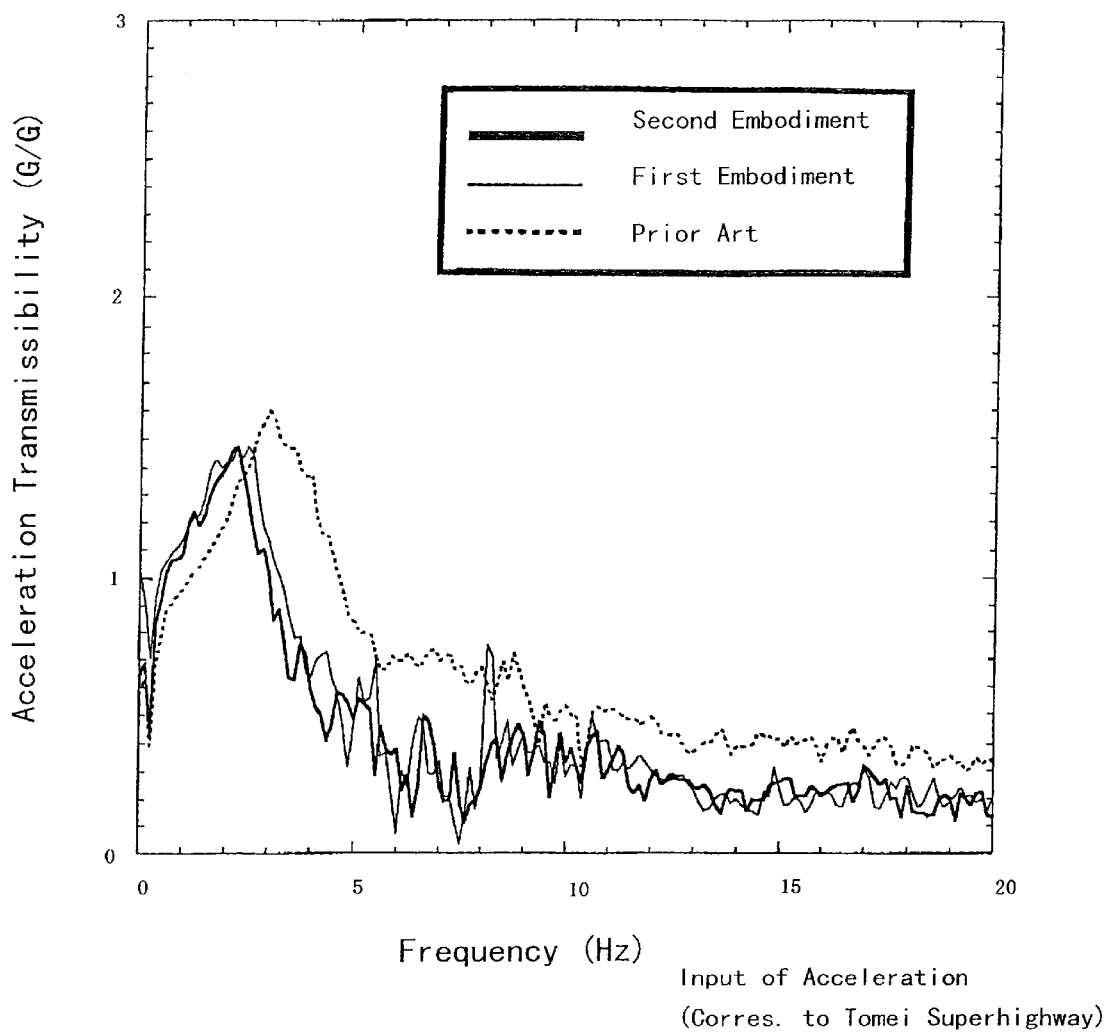
FIG. 13 is a graphical representation showing frequency characteristics of each of the suspension unit of FIG. 10 and the conventional suspension unit obtained by exposing the suspension units to excitation by a random wave gathered on a superhighway.

The suspension unit 60 of the illustrated embodiment, as described above, includes the magnetic damper mechanism 70, to thereby smoothly accommodate to a phase delay with respect to vibration randomly inputted thereto. Thus, the suspension unit 60 of the illustrated embodiment permits its vibrational characteristics to be stably improved as shown in FIG. 13, as compared with the suspension unit 10 of the first embodiment described above. Also, it exhibits improved shock relief characteristics.

Figure 15:
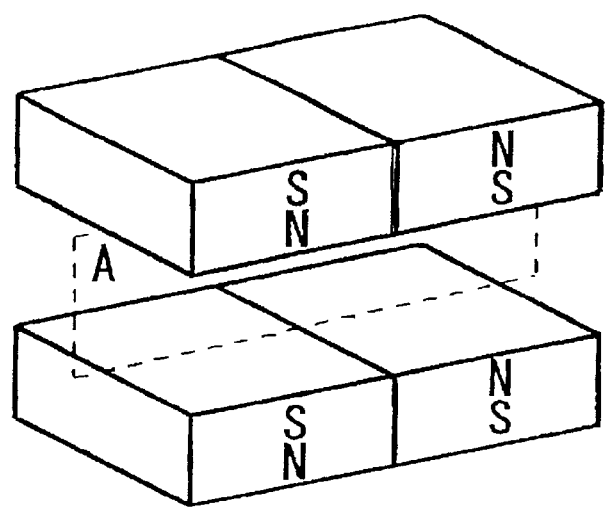
FIGS. 15(a) and 15(b) each are a graphical representation showing a magnetic force distribution of a double-pole magnet.
Figure 15:
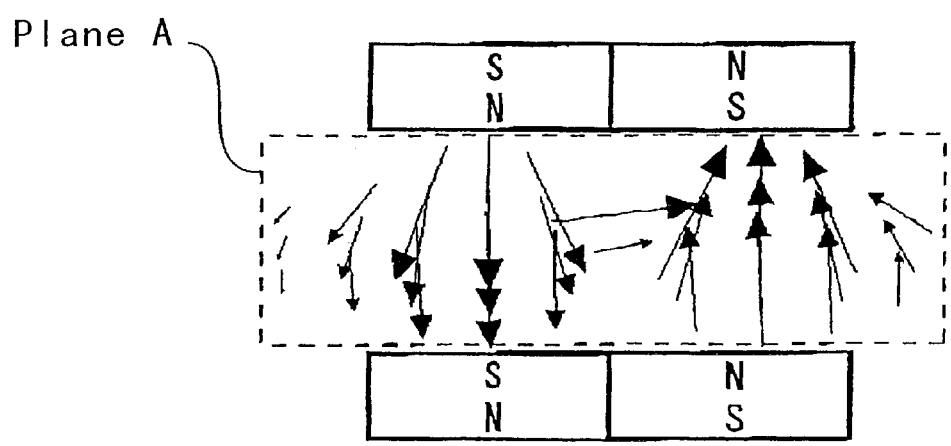

In order that the suspension unit 60 may more fully exhibit damping performance, it may be preferably constructed in such a manner as shown in FIG. 12. More specifically, multipole magnets and preferably double-pole magnets acting as a pair of the permanent magnets 71 and 72 are so arranged that different poles thereof face each other and the operation member 73 crosses a leakage magnetic field formed at a boundary between N poles of the magnets and S poles thereof when it carries out relative movement in a vertical direction. Thus, a distribution of magnetic force on a plane A obtained when the double-pole magnets in a pair are arranged opposite to each other in an attracting direction or a direction in which they attract each other as shown in FIG. 15(*a*) is permitted to be homogenous as shown in FIG. 15(*b*), resulting in a magnetic circuit thereof being a closed circuit. Therefore, a conductor made of copper or the like is moved between the permanent magnets in a pair so as to substantially perpendicularly cross a leakage flux between the permanent magnets, so that a positive electric field and a negative electric field may act on each other to provide damping force at an increased magnitude, unlike the case that single-pole magnets are arranged opposite to each other in the attracting direction.

Figure 14:
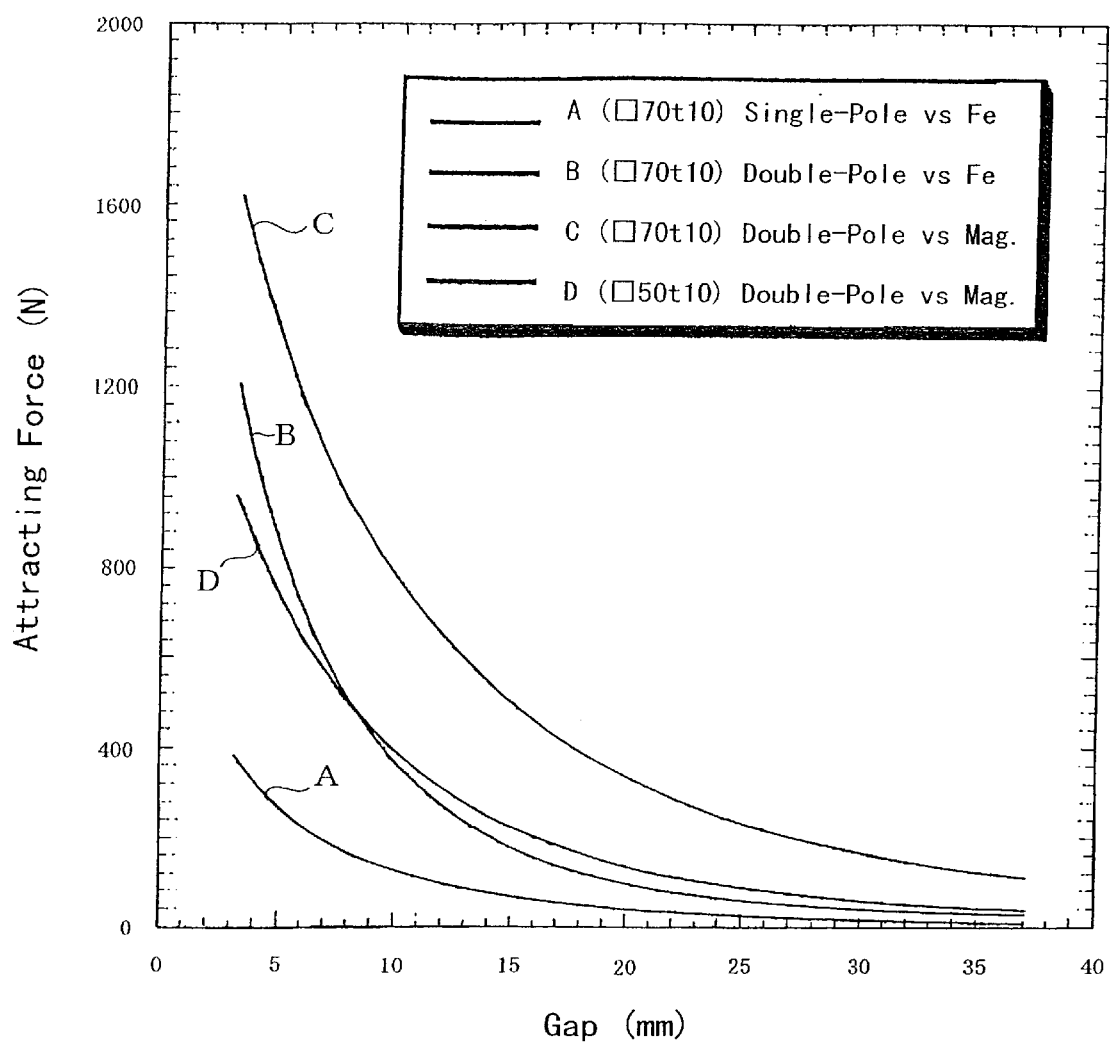
FIG. 14 is a graphical representation showing relationship between a gap and attracting force in each of a single-pole magnet and a double-pole magnet.

Such an advantage of the illustrated embodiment will be more fully described with reference to FIG. 14, wherein A indicates relationship between a gap between a single-pole magnet and iron arranged opposite to each other (opposite area: 70×70 mm$^2$, thickness: 10 mm) and attracting force when excitation takes place using a triangular wave at 100 mm/min (stroke: ±17 mm), B indicates relationship between a gap between a double-pole magnet and iron arranged opposite to each other (opposite area: 70×70 mm$^2$, thickness: 10 mm) and attracting force when excitation takes place using a triangular wave at 100 mm/min (stroke: ±17mm), C indicates relationship between a gap between double-pole magnets arranged opposite to each other in the attracting direction (opposite area: 70×70 mm$^2$, thickness: 10 mm) and attracting force when excitation takes place using a triangular wave at 100 mm/min (stroke: ±17 mm), and D indicates relationship between a gap between double-pole magnets arranged opposite to each other in the attracting direction (opposite area: 50×50 mm$^2$, thickness: 10 mm) and attracting force when excitation takes place using a triangular wave at 100 mm/min (stroke: ±17 mm). As will be apparent from FIG. 14, the double-pole magnets exhibit enhanced attracting force.

In this regard, force by a magnetic field is represented by an expression $F=B^2 A/2 \mu_0$, wherein B indicates magnetic flux density, $\mu_0$ is absolute magnetic permeability and A is an opposite area. Thus, an increase in attracting force means an increase in magnetic flux density.

Figure 16:
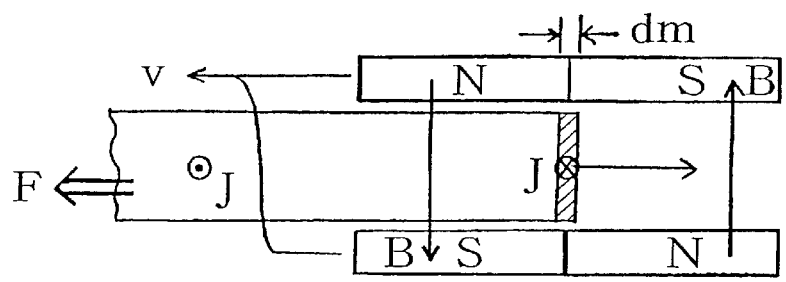
FIG. 16 is a schematic view showing a current induced in double-pole magnetic flux.

Also, as shown in FIG. 16, supposing that two permanent magnets arranged opposite to each other in the attracting direction are moved at a velocity v in a left-hand direction in FIG. 16 while keeping a conductor arranged between the permanent magnets, it is considered that a current induced when the conductor crosses a boundary between N poles of the permanent magnets and S poles thereof is permitted to concentratedly flow through a region hatched in FIG. 16.

At this time, interlinkage magnetic flux is varied from $\phi(B)$ to $-\phi(-B)$ for $\Delta t = d/v$ seconds.

Thus, a magnetic filed E is $$E=-dB/dt=-\{(-B)-B\}/\Delta t=2B/\Delta t=2Bv/d.$$

Also, current density is $J=\sigma E$, $f=JB$; therefore, the following expression (17) may be obtained:

$$F = \int_V \frac{2\sigma B^2 v}{d} dV = \frac{2\sigma B^2 v}{d} \cdot V \tag{17}$$

A conventional magnetic damper is reduced in magnetic flux density to a level below 0.5T, resulting in substantially depending on a velocity of a conveyance. Thus, as will be noted from the above expression, the force F is affected by $B^2$. However, the conventional magnetic damper is increased in dependence on the velocity, because the magnetic flux density is reduced to a level substantially below 1T. However, in the case of double-pole magnets, the above-described expression permits an electric field to be doubled due to changing-over of the magnetic flux, even when the force is affected by $B^2$. Thus, as shown in FIG. 14, arrangement of double-pole magnets in an attracting system permits a homogeneous magnetic field to be formed, to thereby provide a region of 0.5T or more, so that a magnetic flux term of the expression described above produces an increased effect as compared with a velocity term thereof. This permits damping force to be highly increased even at a low velocity, although it somewhat depends on a velocity, regulating in providing a magnetic damper decreased in variation of damping force. Such facts reveals that double-pole permanent magnets of a pair wherein at least 50% of magnetic flux in a gap between the permanent magnets has magnetic flux density of about 0.5T or more are preferably arranged.

Figure 17:
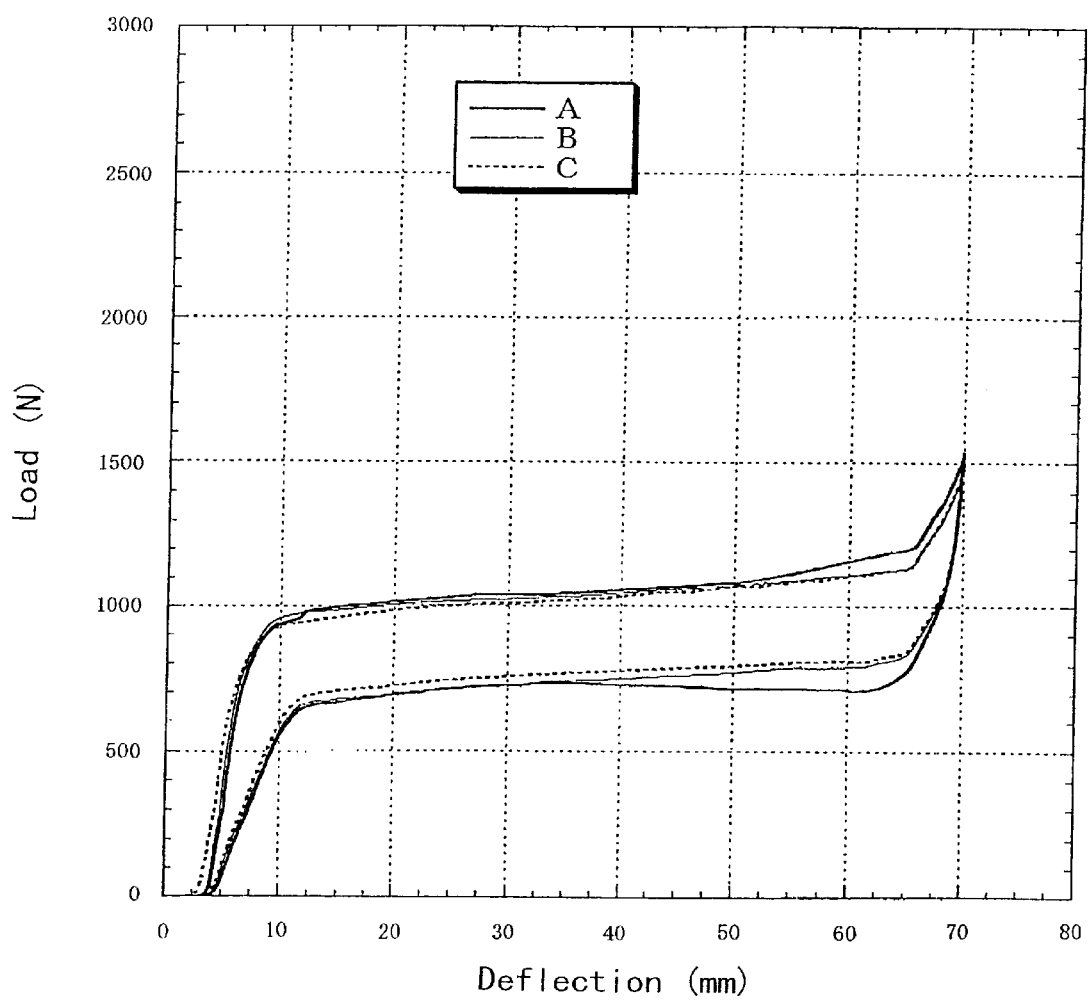
FIG. 17 is a graphical representation showing a load-deflection curve of static characteristics obtained due to excitation by a triangular wave carried out on each of the vibration relief apparatus of the second embodiment (A), a vibration relief apparatus (B) constructed in substantially the same manner as the second embodiment except that no magnetic damper mechanism is arranged, and a vibration relief apparatus (C) constructed in substantially the same manner as the second embodiment except no magnetic damper and shock absorber are arranged.

FIG. 17 shows a load-deflection curve indicating static characteristics which is obtained by each of (A) the vibration relief apparatus of the second embodiment including the magnetic damper mechanism 70 and shock absorber 50 as a damping mechanism, (B) a vibration relief apparatus constructed like the second embodiment except that no magnetic damper mechanism is arranged, and (C) a vibration relief apparatus constructed like the second embodiment except that no magnetic damper mechanism and shock absorber are arranged, when the apparatus each are subject to excitation using a triangular wave of 100 mm/min.

As will be noted from FIG. 17, the magnetic damper mechanism acts in a direction toward a bottom or floor of a vehicle even at a low velocity, unlike the shock absorber.

As can be seen form the foregoing, the vibration relief apparatus of the present invention includes the first spring mechanism and second spring mechanism horizontally arranged on the linkage so as to exhibit the negative spring characteristics and positive spring characteristics, respectively. Such construction permits a spring constant of the spring system constituted by the first spring mechanism and second spring mechanism about the equilibrium point to be set near 0, to thereby produce a phase delay in a low-frequency region, so that the vibration relief apparatus may exhibit enhanced vibration absorbing characteristics. In particular, incorporation of the magnetic damper in the vibration relief apparatus contributes to an improvement in transmission characteristics of the apparatus about the resonance point and shock and vibration absorbing characteristics thereof. Also, it permits vibration inputted to one of both frames to be more effectively absorbed without substantially affecting the other frame.

Further, the magnetic damper of the present invention is mainly constituted by the metal springs. Thus, when the magnetic damper is incorporated in the vibration relief apparatus, it may utilize a leakage magnetic field produced in a closed circuit formed by arranging the permanent magnets opposite to each other, to thereby provide an efficient magnetic circuit. Thus, the magnetic damper may utilize magnets reduced in volume, resulting in being simplified in structure and reduced in manufacturing cost.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A vibration relief apparatus comprising:
   a linkage including a pair of frames;
   a first one of said frames being arranged so as to be vertically movable with respect to a second one of said frames;
   a first spring mechanism constituted of a plurality of metal springs substantially horizontally held on said linkage being able support a load mass at a position of an equilibrium point and exhibiting negative spring characteristics below the equilibrium point; and
   a second spring mechanism for generating lifting force for adjusting a load mass difference with respect to said the first one of said frames;
   said first spring mechanism and said second spring mechanism cooperating with each other to provide a spring system;
   said spring system having a superposed spring constant set to be about zero at the equilibrium point.

2. A vibration relief apparatus as defined in claim 1, wherein said linkage includes link members; and
   said metal springs constituting said first spring mechanism each are a tension coil spring for forcing said link members of said linkage in a direction in which said link members are closed.

3. A vibration relief apparatus as defined in claim 2, wherein said metal springs each are formed by connecting a plurality of coil springs to each other in series.

4. A vibration relief apparatus as defined in claim 1, wherein said second spring mechanism is constituted of a torsion bar.

5. A vibration relief apparatus as defined in claim 1, further comprising a shock absorber including a piston rod and a cylinder;
   one of said piston rod and cylinder being connected to said one frame and the other thereof being connected to said the other frame.

6. A vibration relief apparatus as defined in claim 1, further comprising a magnetic damper mechanism.

7. A vibration relief apparatus as defined in claim 6, wherein said magnetic damper mechanism includes a pair of permanent magnets and an operation member;
   said permanent magnets each being constituted by a multipole magnet; and
   said operation member being arranged so as to cross a leakage magnetic field formed at a boundary between N poles of said permanent magnets and S poles thereof when it relatively moves in a gap formed between said permanent magnets depending on vibration.

8. A vibration relief apparatus as defined in claim 6, further comprising a shock absorber including a piston rod and a cylinder;
   one of said piston rod and cylinder being connected to said one frame and the other thereof being connected to said the other frame.

* * * * *